April 13, 1954 H. KONET ET AL 2,674,891
CAGING AND CENTERING MECHANISM FOR GYROSCOPES
Filed Nov. 24, 1951 2 Sheets-Sheet 1

INVENTORS
HENRY KONET
KARL J. KLARMAN
BY

ATTORNEY

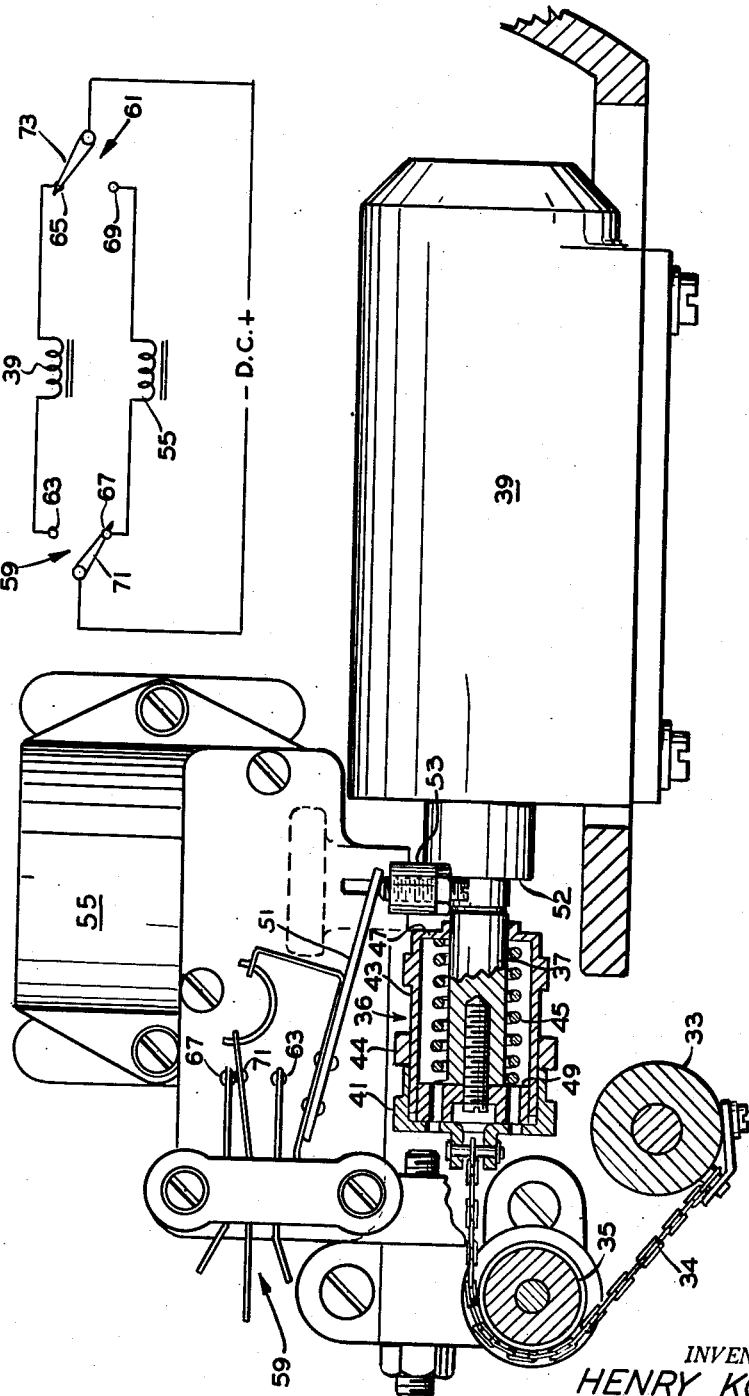

Patented Apr. 13, 1954

2,674,891

UNITED STATES PATENT OFFICE 2,674,891

CAGING AND CENTERING MECHANISM FOR GYROSCOPES

Henry Konet, Hohokus, and Karl J. Klarman, Clifton, N. J., assignors to Bendix Aviation Corporation, Teterboro, N. J., a corporation of Delaware Application November 24, 1951, Serial No. 258,016

12 Claims. (Cl. 74—5.1)

The invention relates to gyroscope devices such as gyro verticals, artificial horizons, etc., and more particularly to mechanism for centering or caging and locking such devices.

One object of the invention is to provide novel centering or caging and locking mechanism for a gyroscope.

Another object is to provide novel mechanism for sequentially centering or caging the gyroscope rotor first about one axis and subsequently about a second axis.

Another object is to provide novel mechanism for centering or caging the gyroscope rotor whether the rotor is spinning or at rest.

Another object is to provide novel centering or caging mechanism operable irrespective of the angle of departure of the rotor from centered position.

Another object is to provide novel centering or caging and locking mechanism which is power operated and may be remotely controlled.

The invention contemplates a centering or caging mechanism for a gyroscope having a rotor spinning in a support about one axis and a gimbal mounting the support for freedom about mutually perpendicular axes other than the spin axis. The mechanism includes cam-like members rigid with the gimbal and with the rotor support. Means is provided for engaging the cam-like members to rotate the gimbal and rotor support about the mutually perpendicular axes until the rotor spin axis assumes a predetermined attitude.

The engaging means is moved into engagement with the cam-like members by a solenoid, and the engaging means is held in engaging position by a latch. Operation of a second solenoid releases the latch to uncage the gyroscope and provide for its normal operation.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only, and are not intended as a definition of the limits of the invention.

Figure 1:
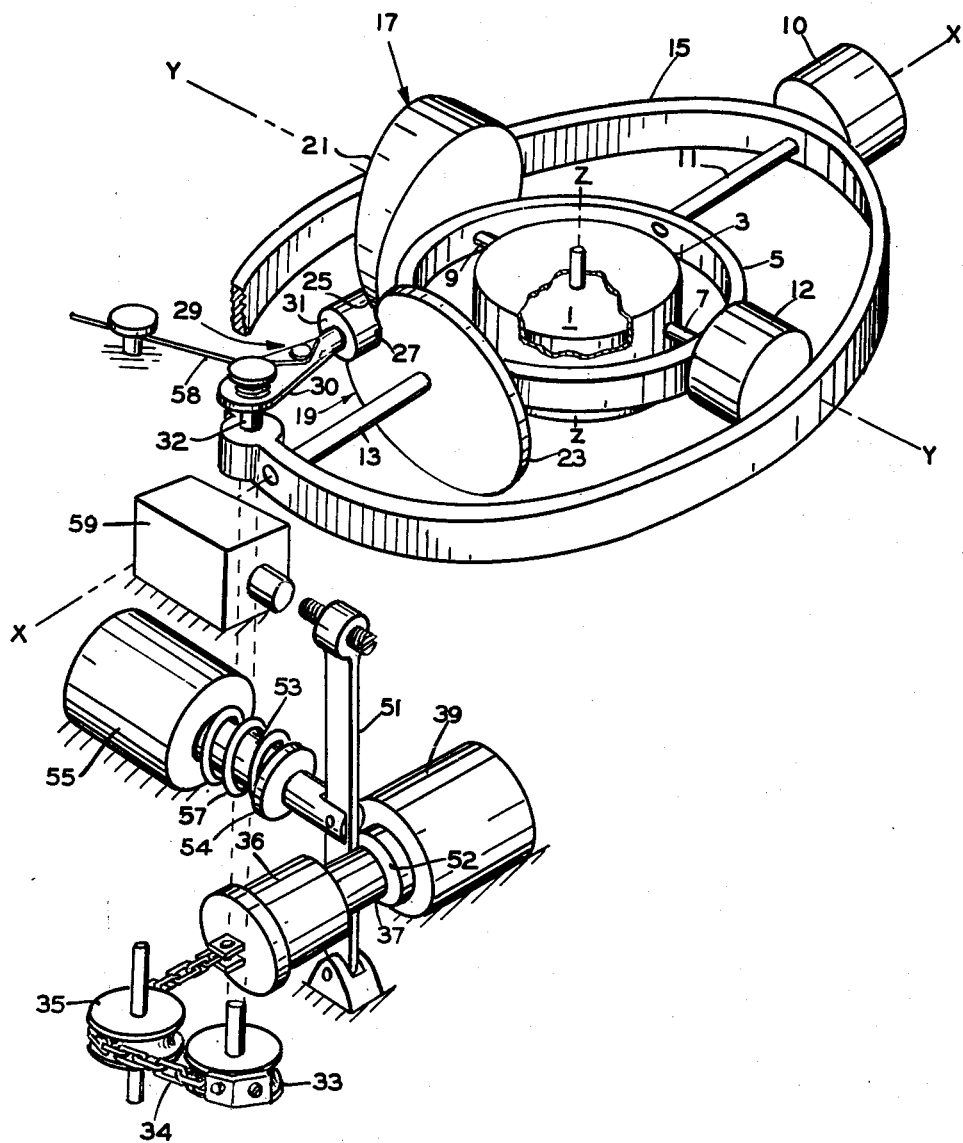
Figure 1:

In the drawings, Fig. 1 is a schematic perspective view of a gyroscope constructed according to the invention and shown in caged position.

Fig. 2 is a detailed view of the novel caging mechanism drawn to enlarged scale and showing some of the parts in horizontal section, and Fig. 3 is an electrical diagram showing the switching arrangement for caging and uncaging the gyroscope.

Referring now to the drawings for a more detailed description of the novel centering or erecting and caging mechanism of the present invention, the mechanism is shown as applied to a gyro vertical including a rotor 1 rotatable within a casing or support 3 for spinning about a normally vertical axis Z. The rotor casing is mounted for oscillation about a horizontal axis Y within a gimbal 5 by trunnions 7, 9. The gimbal is mounted for oscillation about a second horizontal axis X perpendicular to axis Y by trunnions 11, 13 supported by a housing or frame 15 fixed to the craft on which it is mounted. The gyroscope rotor has three degrees of freedom, and the instrument, when mounted on a craft, has its trunnions 11, 13 extending parallel to the longitudinal or bank craft axis, and its trunnions 7, 9 extending parallel to the transverse or pitch craft axis.

The gyroscope may have pick-offs 10, 12 of any suitable kind for indicating the pitch and bank angles of the craft and any suitable erecting means (not shown) may be used for precessing the spin axis of the gyroscope to a predetermined attitude.

The novel caging and centering apparatus of the present invention includes a barrel cam 17 secured to trunnion 9 exteriorly of gimbal 5 for oscillation with motor casing 3 about the Y axis. A heart-shaped cam 19 is secured to trunnion 13 for oscillation with gimbal 5 about the X axis. Cams 17, 19 have cam faces 21, 23 with detents 25, 27 respectively. A cam follower 29 is pivoted to frame 15 and swings between caging and uncaging positions and includes a roller 31 for engaging both cams 17, 19.

Roller 31, when actuated, first engages heart cam 19 and rides on the associated cam face 23 and rotates gimbal 5 about the X axis until the roller enters detent 27 and locks the gimbal in centered position. The roller, upon further movement, engages barrel cam 17 and rides over the associated cam face 21 and rotates rotor casing 3 about the Y axis until the roller enters detent 25 and locks the rotor casing in centered position.

Cam follower 29 comprises an arm 30 mounting roller 31 and fixed to one end of a shaft 32 movable angularly in frame 15. A pulley 33 is fixed to the other end of shaft 32. Roller 31 is pivoted into engagement with cams 19, 17 by a chain 34 secured at one end to pulley 33 and extending around a pulley 35 rotatable relative to frame 15. The other end of chain 34 is secured to a cylinder 36 slidable on a plunger 37 which is moved axially upon energization of a solenoid 39.

Cylinder 36 comprises a pair of cup-shaped elements 41, 43 (Fig. 2) secured together by a ring 44 or other suitable means. A compression spring 45 within the cylinder seats at one end on an inwardly extending flange 47 on element 43 and at its other end on a member 49 secured to plunger 37. When solenoid 39 is energized, the plunger is drawn into the solenoid and compresses spring 45 which exerts a force on cylinder 36 causing the cylinder to slide axially on plunger 37 and pivot cam follower 29 so that roller 31 sequentially engages cams 19 and 17 in the manner described above to cage and lock the gyroscope.

Plunger 37 is held in retracted position within the solenoid 39, when the solenoid is de-energized, by a latch 51 pivoted to frame 15 and engaging a shoulder 52 on the plunger. The latch is pivotally secured approximately at its midpoint to a plunger 53 of a solenoid 55. Plunger 53 and latch 51 are urged to latching position by a compression spring 57 encircling plunger 53 and seated at one end on solenoid 55 and at its other end on a shoulder 54 of plunger 53. The gyroscope is uncaged by energizing solenoid 55 to release latch 51 from engagement with plunger 37. A spring 58, secured at one end to cam follower 29 and at its other end to frame 15, withdraws roller 31 from detents 25, 27 and releases the gyroscope for normal operation.

A manually operated single pole double throw switch 61 (Fig. 3) is provided for energizing solenoids 39, 55 to cage and uncage the gyroscope and a single pole double throw switch 59 operated by latch 51 provides for de-energizing the solenoids.

Solenoids 39, 55 are connected in parallel with one another and in series with switches 59, 61 to a direct current source. Solenoid 39 is connected to fixed contacts 63, 65 of switches 59, 61, respectively, and solenoid 55 is connected to fixed contacts 67, 69 of switches 59, 61, respectively. Movable contact 71 of switch 59 engages fixed contact 67 when latch 51 holds plunger 37 in caging position, and movable contact 71 engages fixed contact 63 when latch 51 releases plunger 37 and the gyroscope is in uncaged position.

The gyroscope may be caged by moving contact 73 of switch 61 into engagement with fixed contact 65 whereupon solenoid 39 is energized through contacts 63, 71 of switch 59.

Movement of latch 51 into engagement with shoulder 52 of plunger 37 provides for movement of movable contact 71 of switch 59 from engagement with fixed contact 63 into engagement with fixed contact 67 to de-energize solenoid 39.

The gyroscope may be uncaged by moving contact 73 of switch 61 into engagement with fixed contact 69 whereupon solenoid 55 is energized through contacts 67, 71 of switch 59 and latch 51 releases plunger 37 to uncage the gyroscope. Movement of latch 51 moves contact 71 out of engagement with contact 67 into engagement with fixed contact 63 to de-energize solenoid 55.

The novel caging mechanism described herein provides for centering or caging the gyroscope rotor sequentially first about one axis and then about a second axis whether the rotor is spinning or at rest and irrespective of the angle of departure of the rotor from centered position. The mechanism is power operated and may be remotely controlled.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:
1. Caging mechanism for a gyroscope comprising the combination with a rotor adapted for spinning in a support about one axis and a gimbal mounting said support for freedom about mutually perpendicular axes other than said spin axis, of members rotatable with said gimbal and with said support, means for engaging said members to move said gimbal and said support to caged position, a solenoid including a plunger operatively connected to said means for moving said means into engagement with said members for caging said gyroscope, a latch adapted to hold said plunger in caging position, and means for releasing said latch to uncage said gyroscope.

2. Caging mechanism for a gyroscope comprising the combination with a rotor adapted for spinning in a support about one axis and a gimbal mounting said support for freedom about mutually perpendicular axes other than said spin axis, of members rotatable with said gimbal and with said support, means for engaging said members to move said gimbal and said support to caged position, a solenoid including a plunger operatively connected to said means for moving said means into engagement with said members for caging said gyroscope, a latch adapted to hold said plunger in caging position, means for releasing said latch to uncage said gyroscope, and switching means operated by said latch for de-energizing said solenoid.

3. Caging mechanism for a gyroscope comprising the combination with a rotor adapted for spinning in a support about one axis and a gimbal mounting said support for freedom about mutually perpendicular axes other than said spin axis, of a member rotatable with said gimbal, a second member rotatable with said support, means for engaging said members to move said gimbal and said support to caged position, a solenoid, and resilient means operatively connecting said engaging means to said solenoid so that upon operation of said solenoid said engaging means engages said members and cages said gyroscope.

4. Caging mechanism for a gyroscope comprising the combination with a rotor adapted for spinning in a support about one axis and means mounting said support for freedom about mutually perpendicular axes other than said spin axis, cam-like members rotatable with said means and with said support, follower means for engaging said members to move said mounting means and said support to caged position, a solenoid including a plunger, resilient means drivably connecting said plunger to said follower means, said solenoid when energized moving said follower means to cage the gyroscope, a latch to hold said plunger in caging position, a second solenoid for releasing said latch, and a switch operated by said latch for de-energizing said solenoids.

5. A caging and centering device for a gyroscope comprising the combination with a rotor adapted for spinning in a support about one axis, and a gimbal mounting said support for freedom about mutually perpendicular axes other than said spin axis, of a member rotatable with said gimbal, a second member rotatable with said support, and pivoted follower means mounted independently of said support and said gimbal and including a single element for sequentially engaging both of said members to move said gimbal and said support to centered position, and a solenoid for moving said element into engagement with said members, and resilient means drivably connecting said solenoid to said follower means.

6. In a gyroscope having a rotor spinning in a support about one axis and means mounting said support for rotation about mutually perpendicular axes other than said spin axis, cam-like members rotatable with said means and with said support, means engaging said members to move said rotor about said mutually perpendicular axes to caged position, and a solenoid for moving said engaging means into engagement with said members for caging said gyroscope, and resilient means drivably connecting said solenoid to said engaging means.

7. In a gyroscope having a rotor spinning in a support about one axis and means including a gimbal mounting said support for rotation about mutually perpendicular axes other than said spin axis, cam-like members rotatable with said gimbal and with said support, follower means for engaging said members to position said gimbal and said support with the rotor spin axis in a predetermined attitude, a solenoid, and resilient means operatively connecting said follower means and said solenoid so that when said solenoid is operated, said follower means engages said members and cages said gyroscope.

8. In a gyroscope having a rotor spinning in a support about one axis and means including a gimbal mounting said support for rotation about mutually perpendicular axes other than said spin axis, cam-like members rotatable with said gimbal and with said support, follower means for engaging said cam-like members to position said gimbal and said support with the rotor spin axis in a predetermined attitude, a solenoid including a plunger, resilient means operatively connecting said plunger and said follower means for moving said follower means into engagement with said members and caging said gyroscope when said solenoid is operated, a latch for holding said plunger in caging position, and a solenoid for releasing said latch to uncage the gyroscope.

9. In a gyroscope having a rotor spinning in a support about one axis and means including a gimbal mounting said support for rotation about mutually perpendicular axes other than said spin axis, cam-like members rotatable with said gimbal and with said support, follower means for engaging said cam-like members to position said gimbal and said support with the rotor spin axis in a predetermined attitude, a solenoid including a plunger, resilient means operatively connecting said plunger and said follower means for moving said follower means into engagement with said members for caging said gyroscope when said solenoid is energized, a latch for holding said plunger in caging position, a solenoid adapted to be energized to release said latch for uncaging said gyroscope, and switching means operated by said latch to de-energize said solenoids.

10. In a gyroscope having a rotor spinning in a support about one axis and means including a gimbal mounting said support for rotation about mutually perpendicular axes other than said spin axis, cam-like members rotatable with said gimbal and with said support, follower means for engaging said cam-like members to position said gimbal and said support with the rotor spin axis in a predetermined attitude, a solenoid including a plunger, resilient means operatively connecting said follower means and said plunger for moving said follower means into engagement with said members when said solenoid is energized to cage said gyroscope, a latch for holding said plunger in caging position, a solenoid adapted to be energized to release said latch for uncaging the gyroscope, manually operated switching means for energizing one or the other of said solenoids, and automatic switching means operated by said latch for de-energizing said solenoids.

11. In a gyroscope having a rotor spinning in a support about one axis and means mounting said support for rotation about mutually perpendicular axes other than said spin axis, cam-like members rotatable with said means and with said support, follower means engaging said members to move said rotor about mutually perpendicular axes to caged position, a solenoid including a plunger, a member slidable on said plunger, a spring drivably connecting said member to said plunger, and means for operating said solenoid to move said follower means to cage the gyroscope.

12. In a gyroscope having a rotor spinning in a support about one axis and means including a gimbal mounting said support for rotation about mutually perpendicular axes other than said spin axis, cam-like members rotatable with said gimbal and with said support, follower means for engaging said cam-like members to position said gimbal and said support with the rotor spin axis in a predetermined attitude, resilient means urging said follower means to disengaged position, a solenoid including a plunger, resilient means operatively connecting said plunger and said follower means for moving said follower means into engagement with said members and caging said gyroscope when said solenoid is operated, a latch for holding said plunger in caging position, and a solenoid for releasing said latch to uncage the gyroscope.

References Cited in the file of this patent

UNITED STATES PATENTS

| Number | Name | Date |
| --- | --- | --- |
| 1,996,896 | Bennett | Apr. 9, 1935 |
| 2,507,451 | Molnar et al. | May 9, 1950 |
| 2,580,748 | Fillebrown | Jan. 1, 1952 |

FOREIGN PATENTS

| Number | Country | Date |
| --- | --- | --- |
| 943,600 | France | Oct. 4, 1948 |